(12) United States Patent
Pettinaroli et al.

(10) Patent No.: US 9,910,447 B2
(45) Date of Patent: Mar. 6, 2018

(54) AUTOMATIC BALANCING VALVE

(71) Applicant: FRATELLI PETTINAROLI S.p.A., San Maurizio D'Opaglio (NO) (IT)

(72) Inventors: Giulio Pettinaroli, San Maurizio D'Opaglio (IT); Liborio Spagnolo, San Maurizio D'Opaglio (IT); Sergio D'Andrea, San Maurizio D'Opaglio (IT)

(73) Assignee: FRATELLI PETTINAROLI S.P.A., San Maurizio D'Opaglio (NO) (IT)

( * ) Notice: Subject to any disclaimer, the term of this patent is extended or adjusted under 35 U.S.C. 154(b) by 10 days.

(21) Appl. No.: 15/062,649

(22) Filed: Mar. 7, 2016

(65) Prior Publication Data
US 2016/0266584 A1 Sep. 15, 2016

(30) Foreign Application Priority Data

Mar. 10, 2015 (IT) .............................. MI2015A0362

(51) Int. Cl.
| | |
|---|---|
| *F16K 31/12* | (2006.01) |
| *G05D 7/01* | (2006.01) |
| *F16K 31/53* | (2006.01) |
| *F16K 1/42* | (2006.01) |
| *F16K 3/24* | (2006.01) |
| *F24D 19/10* | (2006.01) |

(52) U.S. Cl.
CPC ............ *G05D 7/0113* (2013.01); *F16K 1/42* (2013.01); *F16K 3/246* (2013.01); *F16K 31/53* (2013.01); *G05D 7/0106* (2013.01); *F24D 19/1015* (2013.01)

(58) Field of Classification Search
CPC .... G05D 7/0113; G05D 7/0106; F16K 31/53; F16K 1/42; F16K 3/246; F24D 19/1015
USPC ... 137/487, 488, 495, 505.18, 613, 501, 502
See application file for complete search history.

(56) References Cited

U.S. PATENT DOCUMENTS

| | | | | |
|---|---|---|---|---|
| 3,344,805 A | * | 10/1967 | Wapner | F16K 31/36 137/486 |
| 4,250,915 A | * | 2/1981 | Rikuta | G05D 7/0106 137/501 |
| 4,790,801 A | * | 12/1988 | Schmidt | F16H 7/1236 474/110 |
| 5,083,802 A | * | 1/1992 | Shimasaki | F16J 15/3276 277/558 |

(Continued)

FOREIGN PATENT DOCUMENTS

| | | |
|---|---|---|
| EP | 1 367 472 | 12/2003 |
| GB | 1 076 401 | 7/1967 |
| WO | WO 2009/135490 | 11/2009 |

OTHER PUBLICATIONS

Extended European Search Resort issued in App. No. 16159343.9 dated Oct. 4, 2016.

(Continued)

*Primary Examiner* — Minh Le
(74) *Attorney, Agent, or Firm* — Nixon & Vanderhye P.C.

(57) ABSTRACT

An automatic balancing valve is described, wherein a pressure regulator device is provided and comprises a sleeve sliding axially between a position opening at least one passage port for the fluid towards the outlet channel and a position closing the passage port/s depending on the pressure difference detected between two different chambers separated by an elastic membrane.

10 Claims, 9 Drawing Sheets

(56) References Cited

U.S. PATENT DOCUMENTS

| | | | | |
|---|---|---|---|---|
| 5,566,711 A * | 10/1996 | Glansk | ............... | F16K 1/10 137/557 |
| 5,642,752 A * | 7/1997 | Yokota | ............... | G05D 7/0106 137/413 |
| 6,033,558 A * | 3/2000 | Yokota | ............... | B01D 29/01 210/107 |
| 6,263,905 B1 * | 7/2001 | Yokota | ............... | F16K 31/363 137/413 |
| 6,932,107 B2 * | 8/2005 | Kirchner | ............... | F16K 31/363 137/501 |
| 7,647,942 B2 * | 1/2010 | Weston | ............... | F16K 3/26 137/454.6 |
| 7,735,514 B2 * | 6/2010 | Marstorp | ............... | F16K 1/526 137/501 |
| 7,967,023 B2 * | 6/2011 | Jorgensen | ............... | F24D 19/1015 137/201 |
| 8,152,134 B2 * | 4/2012 | Stenberg | ............... | F16K 1/465 137/557 |
| 8,424,556 B2 * | 4/2013 | Norlander | ............... | F24D 19/1015 137/240 |
| 8,469,052 B2 * | 6/2013 | Jorgensen | ............... | G05D 7/0106 137/495 |
| 8,596,296 B2 * | 12/2013 | Rasmussen | ............... | F16K 1/526 137/315.04 |
| 8,763,632 B2 * | 7/2014 | Loeffler | ............... | G05D 7/005 137/497 |
| 8,985,140 B2 * | 3/2015 | Pettinaroli | ............... | F24D 19/1015 137/487 |
| 9,273,787 B2 * | 3/2016 | Ibsen | ............... | F16K 3/24 |
| 9,383,033 B2 * | 7/2016 | Pettinaroli | ............... | F24D 19/1036 |
| 2004/0056427 A1 * | 3/2004 | Rapp | ............... | F16J 15/3228 277/549 |
| 2013/0264777 A1 * | 10/2013 | Himeno | ............... | F16J 15/3208 277/549 |
| 2014/0137947 A1 * | 5/2014 | Cunningham | ............... | F16K 39/022 137/12 |
| 2015/0053287 A1 * | 2/2015 | Keber | ............... | F16K 31/04 137/613 |
| 2016/0139606 A1 * | 5/2016 | Loeffler | ............... | F16K 1/443 137/455 |

OTHER PUBLICATIONS

Italian Search Report for IT MI2015A000362, dated Jan. 12, 2016, 2 pages (English portions included).

Italian Written Opinion for IT MI2015A000362, dated Jan. 12, 2016, 6 pages (English portions included).

* cited by examiner

AUTOMATIC BALANCING VALVE

This application claims priority to IT Patent Application No. MI2015A000362 filed 10 Mar. 2015, the entire contents of which is hereby incorporated by reference.

FIELD OF THE INVENTION

The present invention relates in general to an automatic balancing valve and, in particular, to a flow-controller valve with automatic pressure balance.

In plumbing fixtures constituted by several sections, in each section the fluid flow rates are set in the designing step but they can also vary during operations.

For example, referring in particular to heating and/or cooling systems in environments such as schools, hospitals, hotels, shopping centers or the like, during daylight hours the variation in different flow rates with respect to the design data would inevitably cause temperature differences in the various environments that involve an increase of power consumptions, in addition to make unease situations.

PRIOR ART

Automatic balancing valves are already known in the art, usually comprising a valve body in which a differential-pressure regulator device and a flow controller device are housed, both crossed by a fluid entering from an inlet channel and exiting through an outlet channel.

These kinds of valves have essentially the task of adjusting the flow rate of the heat-transfer fluid towards the terminal units of the heating and cooling systems, for example radiators, fan convectors or the like, independently from pressure variations that can occur in these systems. The automatic adjustment of the flow rate is achieved by one or more moving parts that open/obstruct the ports for the fluid passage in the valve as the fluid pressures change upstream and downstream of the valve.

One of the main drawbacks of this kind of valves is that the moving parts able to perform the automatic adjustment are exposed to the passage of a fluid always carrying debris and oxides which shall deposit on the moving parts, thereby generating deposits and scales reducing the responsive efficacy to pressure variations in the system. For example, metal pipes of conditioning systems inevitably release rust dirt carried by the heat-transfer fluid and therefore able to deposit inside the valves, thereby impairing the correct operation thereof.

GB-A-1076401 discloses a flow regulating device having a pressure sensitive element which is movable in response to variations in the difference between the fluid pressures prevailing upstream and downstream of a flow passage.

SUMMARY OF THE INVENTION

That being stated, an object of the present invention is to propose an automatic balancing valve in which the influence of the dirt carried by the fluid on the moving parts automatically adjusting the valve, is reduced or eliminated.

Another object of the present invention is to propose a valve of the above mentioned type that allows minimizing possible deposits and scales on the moving parts that make the automatic adjustment in the valve.

These objects are achieved by the invention through an automatic balancing valve according to claim 1. Further characteristics and advantages of the present invention are set forth in the respective dependent claims.

An automatic balancing valve generally comprises a valve body having at least one inlet channel and at least one outlet channel. In the same valve body, a flow controller device and a differential-pressure regulator device are housed. The differential-pressure regulator device comprises at least one central duct having an end communicating for example with the inlet channel and, at the opposite end, with a valve seat for the plug of the flow controller device. The differential-pressure regulator device comprises an elastic bellows-like membrane separating the inner volume of the regulator in a first chamber hydraulically connected with the inlet channel and a second chamber hydraulically connected downstream of the valve seat and the respective plug with respect to the fluid flow between the inlet channel and the outlet channel.

According to the present invention, the differential-pressure regulator device comprises a sleeve coaxial to the central duct and mechanically connected to the elastic bellows-like membrane. The sleeve slides axially in a seat of a locking insert housed in the valve body between a position opening at least one passage port for the fluid between the second chamber and the outlet channel, and a position closing the passage port/s depending on the pressure difference between the first and the second chamber.

With this arrangement, the fluid crossing the differential-pressure regulator device covers such a path whereby possible debris, in particular rust dirt, is not deposited on the sliding surface of the sleeve, i.e. of the moving part carrying out the automatic adjustment. In other terms, the fluid entering through the inlet channel of the valve crosses the central duct and directly "steps over" the upper edge of the sleeve thereby reaching immediately the outlet channel of the valve.

In order to facilitate the sleeve sliding with respect to the seat in which it is engaged, there is a gap fluidically communicating the second chamber with the outlet channel. Advantageously, a floating gasket surrounding the outer surface of the sleeve and slidingly moving with respect to the latter so as to block the gap depending on the difference between the fluid pressure in the second chamber and the fluid pressure in the outlet channel of the valve, is provided.

Thanks to the floating gasket, or anyway freely sliding along the outer surface of the sleeve, the fluid leakage occurring through the gap has a very little effect in percentage on the automatic adjustment the valve makes. In practice, when the pressure differential between the second chamber and the outlet chamber is high, the floating gasket is biased to close the leakage through the gap, thereby allowing only the adjustment made by the sleeve on the passage port/s towards the outlet channel. Vice versa, when the pressure differential between the second chamber and the outlet channel is relatively low, the floating gasket is carried downwards by the sleeve. The floating gasket can have sections of different kind, for example the section of a lip seal, the circular section of an O-ring, the section of a bellows type gasket or the like.

The special structure of the differential-pressure regulator device in a valve according to the present invention lends itself to be made as a particularly versatile cartridge that can be combined with different type of flow controller devices. For example, embodiments can be provided in which the flow controller device has a translationally movable disk plug, a rotary ball plug, a disk plug provided with superimposed ceramic disks or else a simple gauged-hole disk.

BRIEF DESCRIPTION OF THE DRAWINGS

Further features and advantages of the present invention will be more apparent from the following description which is given by way of illustration and not by way of limitation with reference to the accompanying drawings, in which.

DETAILED DESCRIPTION

Figure 1:
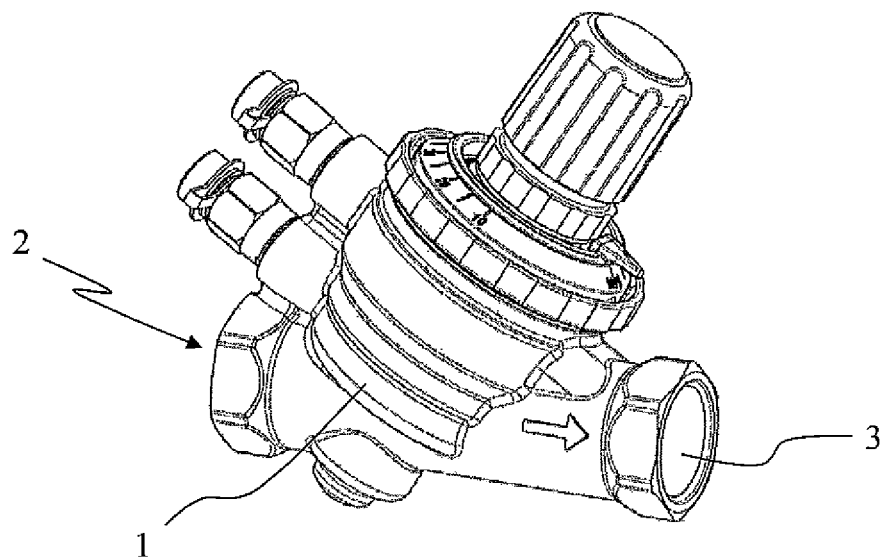
FIG. 1 is a perspective view of an automatic balancing valve in an assembled condition according to the present invention.
Figure 2:
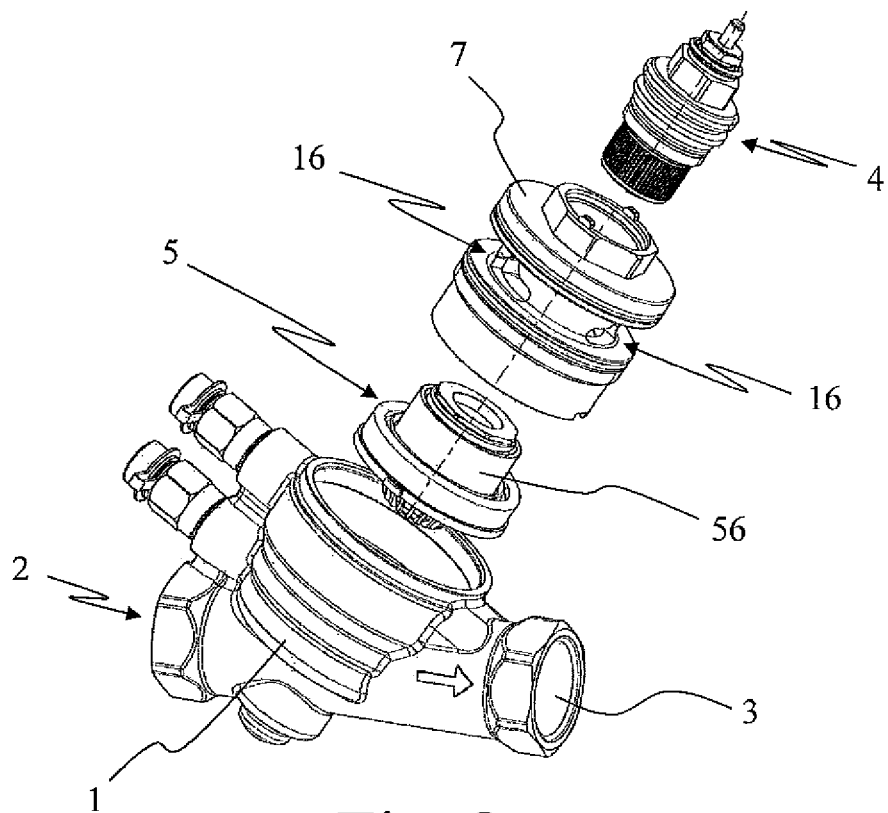
FIG. 2 is an exploded perspective view of some valve components of FIG. 1.

FIGS. 1 and 2 depict an automatic balancing valve according to a possible embodiment of the present invention. The valve comprises a valve body 1 having at least one inlet channel 2 and at least one outlet channel 3. A flow controller device 4, i.e. controlling the flow rate, and a differential-pressure regulator device 5 locked by an insert 7, are housed in the valve body 1. In the locking insert 7 passage ports 16, which can be left completely open otherwise partially or completely blocked, and a sleeve 56 of the differential-pressure regulator device 5, are obtained.

In these kind of valves, as known, the regulator device 5 acts in combination with the device 4 to maintain constant the pressure differential Δp, i.e. (P1−P2 according to signs of FIGS. 3 to 7) between the upstream and downstream portions of the plug 41 of the latter. In other words, if the pressure differential Δp is maintained constant, the flow rate will be constant too.

Figure 3:
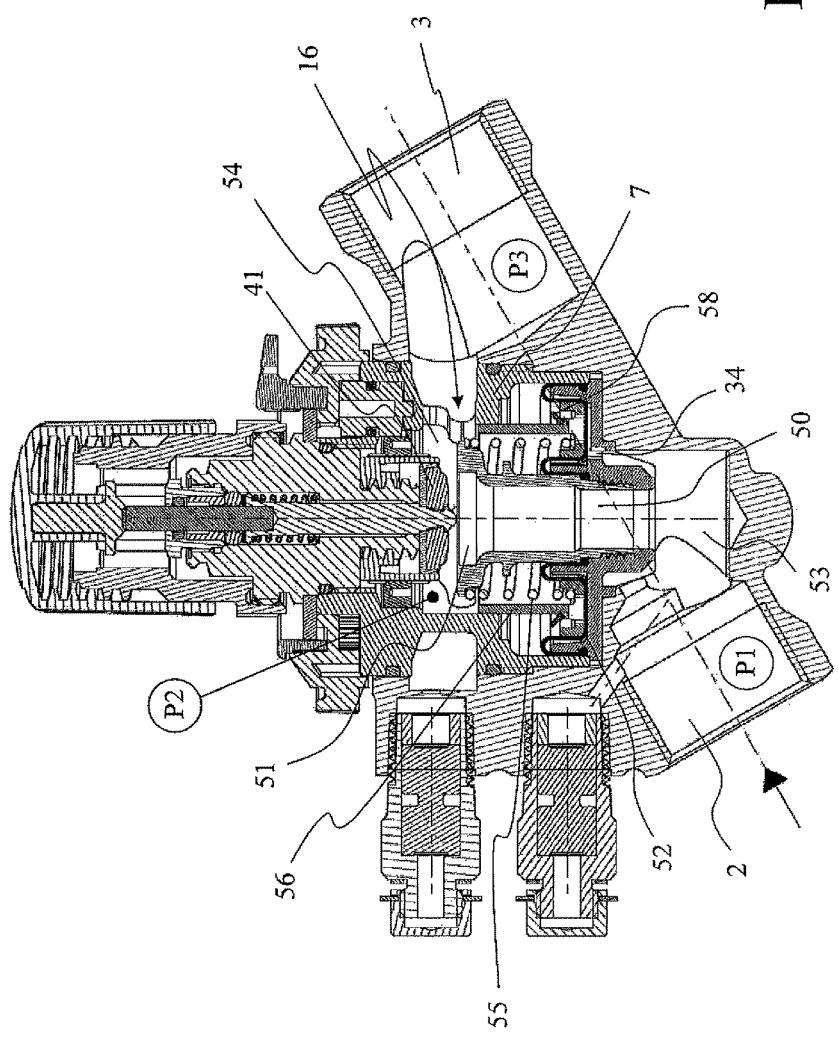
FIG. 3 is a longitudinal sectional view of the valve of FIG. 1 with the differential-pressure regulator device in a first rest condition.

As illustrated in the sectional view of FIG. 3, the differential-pressure regulator device 5 comprises at least one central duct 50 having the lower end communicating with the inlet channel 2 whereas, at the opposite end, it comprises a valve seat 51 for the plug 41 of the flow controller device 4.

The differential-pressure regulator device 5 comprises an elastic bellows-like membrane 52 separating the inner volume of the regulator in a first chamber 53 hydraulically connected with the inlet channel 2 and a second chamber 54 placed downstream of the valve seat 51 and the respective plug 41 with respect to the fluid flow between the inlet channel 2 and the outlet channel 3. The membrane movement 52 is hindered by a countering spring 55 trying to keep it in the position illustrated in FIG. 3 (or in FIG. 7).

The sleeve 56 is mechanically connected to the elastic bellows-like membrane 52 and is arranged coaxially to the central duct 50. The sleeve 56 slides axially in a seat of the locking insert 7 housed in the valve body 1 between a position, depicted in FIGS. 3 and 7, opening the passage ports 16 connecting the second chamber 54 with the outlet channel 3, and a position partially (FIGS. 4 and 6) or totally (FIG. 5) closing the same passage ports 16 depending on the fluid pressure difference between the first 53 and the second 54 chambers.

There is a gap 57 (visible in the enlarged and detailed views of FIGS. 8A-8C), fluidically connecting the second chamber 54 with the outlet channel 3, between the sleeve 56 and the respective seat of the insert 7 in which the sleeve is slidingly engaged. In order to prevent fluid leakages through the gap 57 from affecting the correct valve operation, a floating gasket 58 surrounding the outer surface of the sleeve 56 is provided. The floating gasket 58 slides along the outer surface of the sleeve 56 so as to block the gap 57 depending on the difference between the fluid pressure in the second chamber 54 and the fluid pressure in the outlet channel 3.

The operation of the automatic balancing valve herein described is illustrated below, also by referring to pressure values detected in the various valve sections. The fluid enters the valve and therefore the first chamber 53 through the inlet channel 2 and has an initial pressure P1, then it goes on crossing the central duct 50. At the outlet of the central duct 50, the fluid passes between the seat of the valve 51 and the upper plug 41 of the device 4 for controlling the flow rate, thereby reducing its pressure to the P2 value detected in the second chamber 54. Then the fluid goes on through the passage ports 16, which can be open otherwise partially or completely blocked by the sleeve 56, and reaches the outlet channel 3 with a value pressure P3 just detected by the position of the sleeve 56.

In practice, the differential-pressure regulator device 5 automatically controls and keeps constant the Δp (difference between P1 and P2) at the ends of the flow controller device 4. The automatic action of the regulator device 5 is carried out on the basis of the equilibrium between the force generated by the pressure differential Δp and the countering force of the spring 55 in order to cause the axial displacement of the sleeve 56. If the pressure difference between the entering and exiting fluids (i.e. P1−P3) changes, the regulator device 5 responds by moving the sleeve 56 for opening or closing, totally or partially, the passage ports 16 and keeping constant the Δp value (i.e. P1−P2). In these conditions the flow rate through the valve will be constant.

In FIG. 3 a first rest position is depicted, for example a condition in which there is no fluid flow through the valve. In this condition, the sleeve 56 is in the lowest position, i.e. the position in which the passage ports 16 are completely open. Also the floating gasket 58 is in the lowest position.

Figure 4:
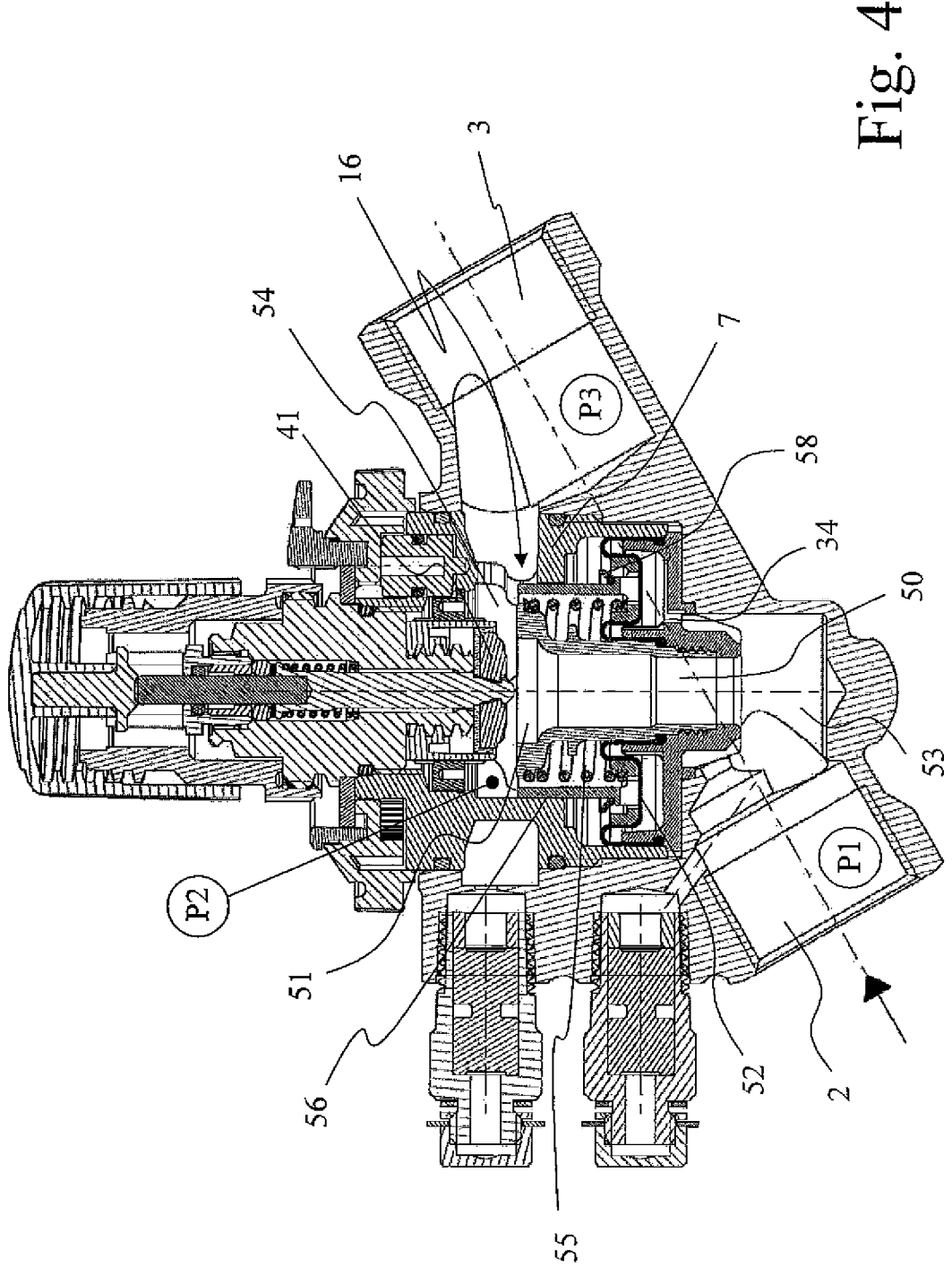
FIG. 4 is a longitudinal sectional view of the valve of FIG. 1 with the differential-pressure regulator device in a first operating condition with moving flow.

In FIG. 4 a first operating condition of the valve is depicted, in which there is a moving flow between the inlet channel 2 and the outlet channel 3. The sleeve 56 moves upwards to partially block the passage ports 16 so that an equilibrium position is reached and determined by the load of the spring 55 and by the pressures acting onto the surface of the membrane 52 to keep constant the pressure differential between P1 and P2. In fact it can be noted that, with respect to the condition depicted in FIG. 3, the elastic bellows-like membrane 52 is in a higher position because of an inlet pressure P1 transmitted from the first chamber 53 under the membrane 52 through a fluid communication duct 34, the inlet pressure being greater than the pressure P2 in the second chamber 54. In this condition, a little flow amount leaks from the gap 57 between the sleeve 56 and the insert 7 without particularly affecting the correct automatic operation of the valve. The floating gasket 58 is still in its lowest position along the sleeve 56. Indeed, if the pressure differential between P2 and P3 is relatively low, the floating gasket 58 does not move from its position. The leakage occurring just before the floating gasket 58 is moved to an active position minimally affects the adjustment of the flow value and remains in the design tolerance value.

As the pressure difference between P1 and P3 increases, the sleeve 56 rises further thereby blocking more and more the passage ports 16 (FIG. 5) to keep constant the pressure differential between P1 and P2. In this case, the pressure difference between P2 and P3 acts on the floating gasket 58 to close the gap 57 between the sleeve 56 and the respective seat of the insert 7, de facto preventing the fluid leakage through the gap 57.

Figure 5:
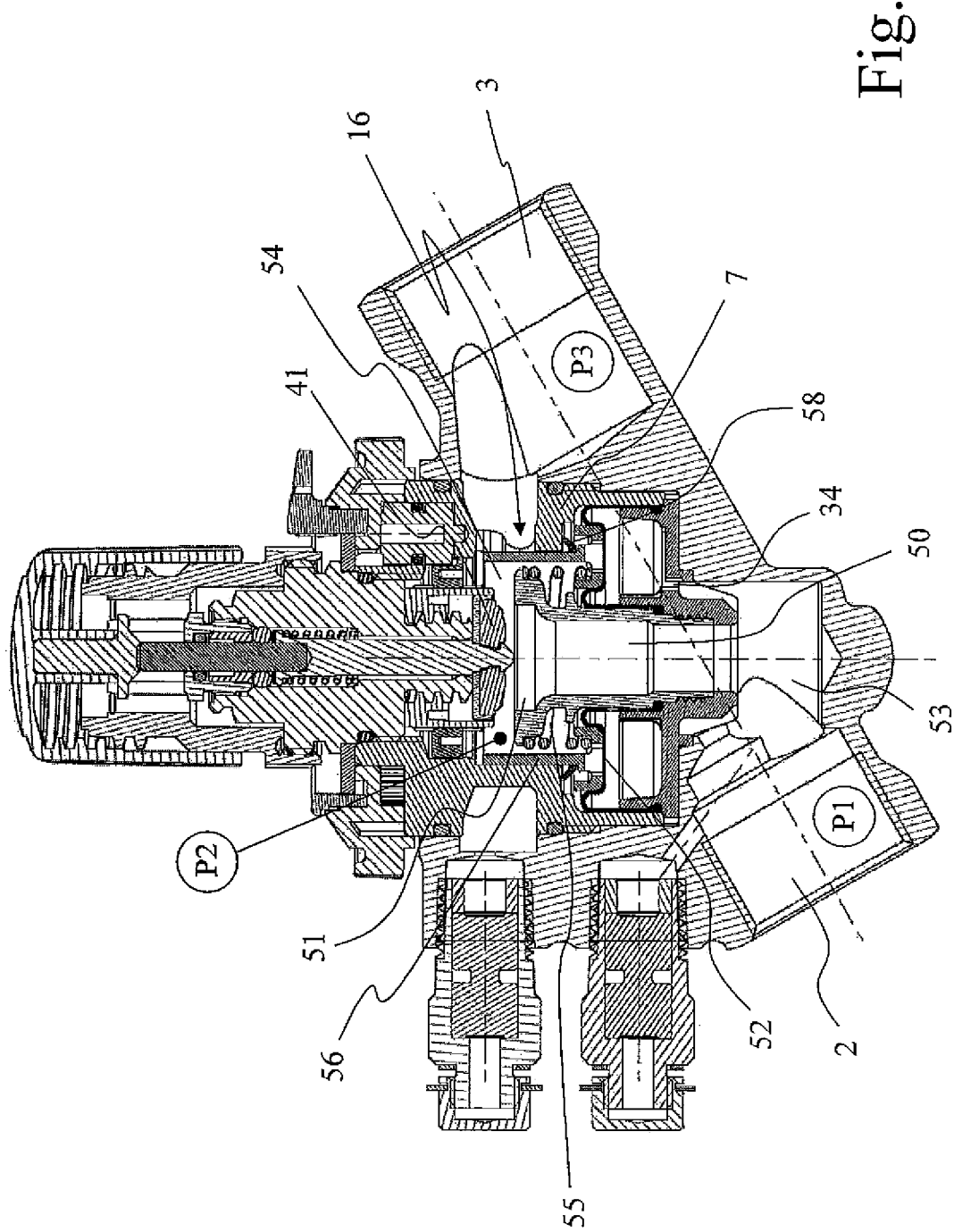
FIG. 5 is a longitudinal sectional view of the valve of FIG. 1 with the differential-pressure regulator device in a second operating condition with moving flow.
Figure 6:
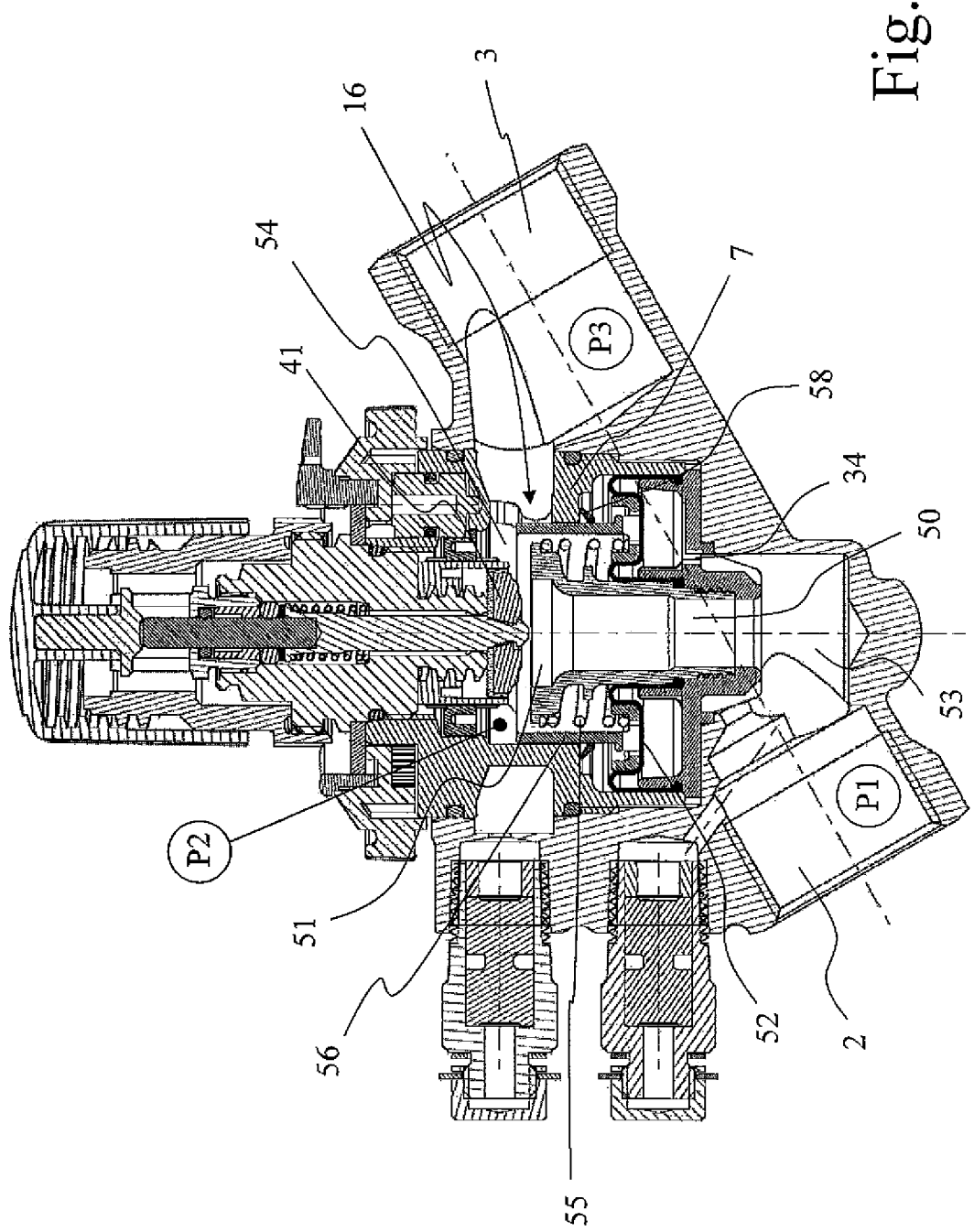
FIG. 6 is a longitudinal sectional view of the valve of FIG. 1 with the differential-pressure regulator device in a third operating condition with moving flow.
Figure 7:
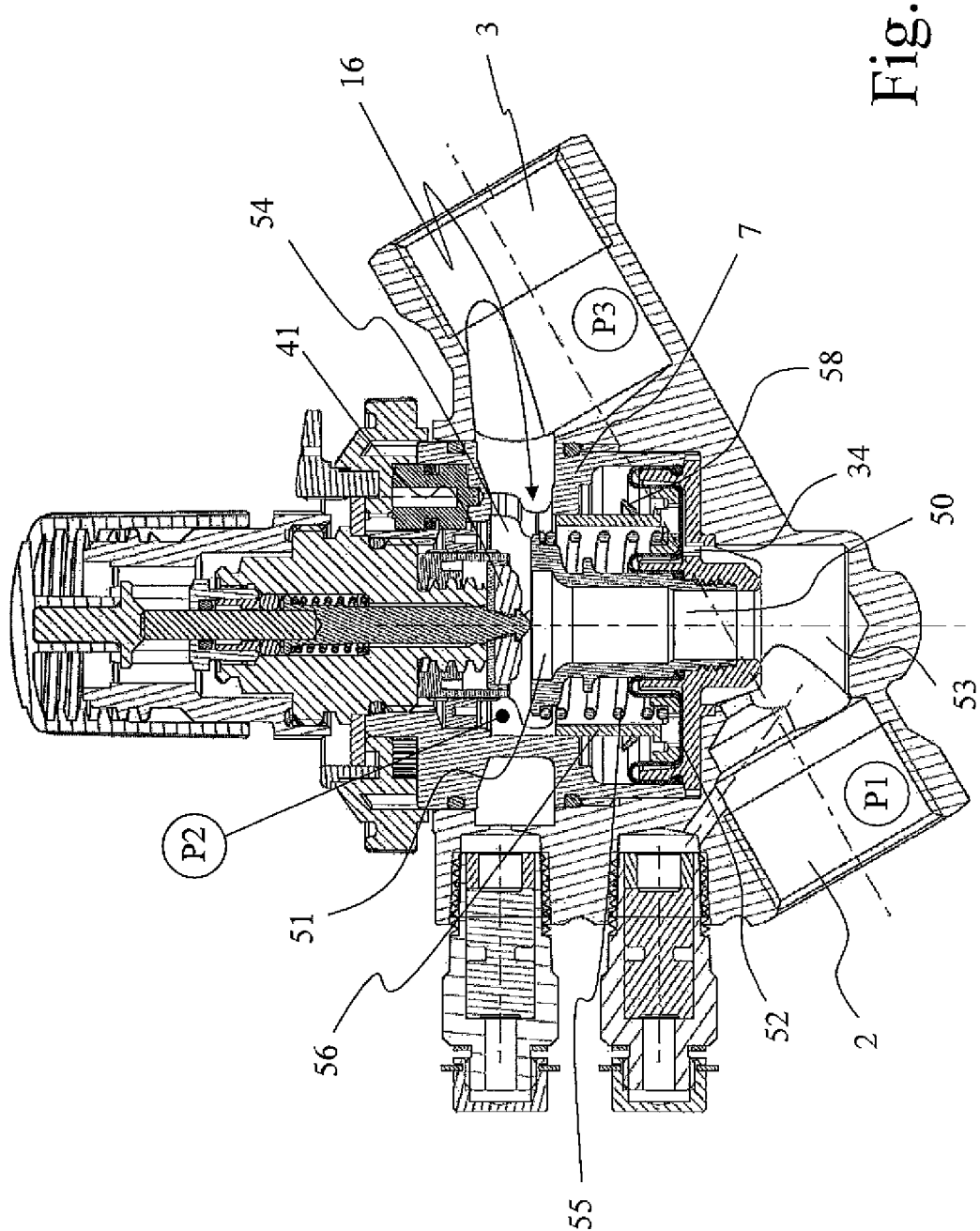
FIG. 7 is a longitudinal sectional view of the valve of FIG. 1 with the differential-pressure regulator device in a second rest condition.

As shown in FIG. 6 as a consequence of the automatic balancing, tending to keep constant the difference between the pressure P1 and the pressure P2, the sleeve 56 goes down with respect to the position adopted in FIG. 5, thereby modulating the flow through the passage ports 16 towards the outlet channel 3. The difference between the pressure P2 and the pressure P3 still acts on the floating gasket 58 by keeping close the gap 57 between the sleeve 56 and the insert 7 and thereby preventing the leakage through the gap itself.

Figure 8C:
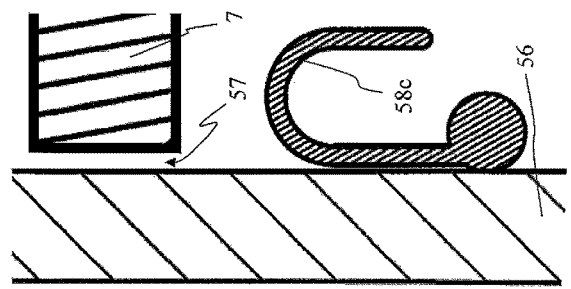
FIGS. 8A, 8B and 8C are sectional enlarged views illustrating various embodiments of a floating gasket assembled on the sleeve of the differential-pressure regulator device.
Figure 8B:
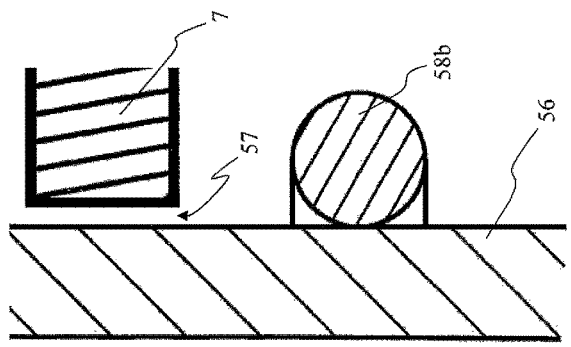
Figure 8A:
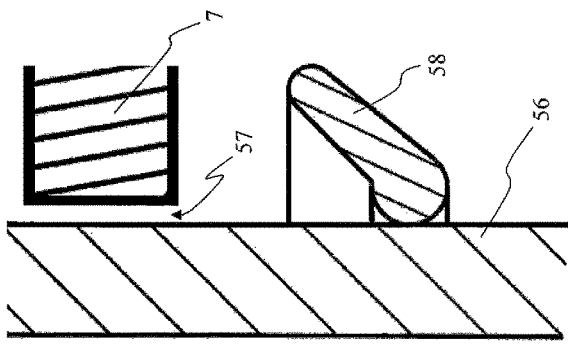

Once the equilibrium has been restored between the pressures P1 and P2 (FIG. 7), the elastic bellows-like membrane 52 and the sleeve 56 mechanically connected thereto come back to the rest position, thereby completely clearing the passage ports 16, similarly to what is denoted in the condition of FIG. 3. However, the floating gasket 58 remains in an intermediate position as the difference between the pressure P2 and the pressure P3 is not great enough to hold it in the position closing the gap 57. In this case, the floating gasket 58 will be able to forestall the closing of the gap 57 when the valve will have to act again with its automatic balancing operation. In FIGS. 8A, 8B and 8C some possible alternative embodiments of the floating gasket sliding along the sleeve 56 are depicted. The floating gasket 58 depicted in FIG. 8A is the same shown in the preceding FIGS. 3 to 7 and is a gasket of lip type. The floating gasket can also be a usual gasket 58$b$ of O-ring type, such as that one depicted in FIG. 8B, or else also a gasket 58$c$ of bellows type, such as that one depicted in FIG. 8C. The floating gasket is anyway preferably made of elastic material, for example rubber or generic elastomers, and is sized so that to allow the its sliding on the outer surface of the sleeve 56.

Figure 9:
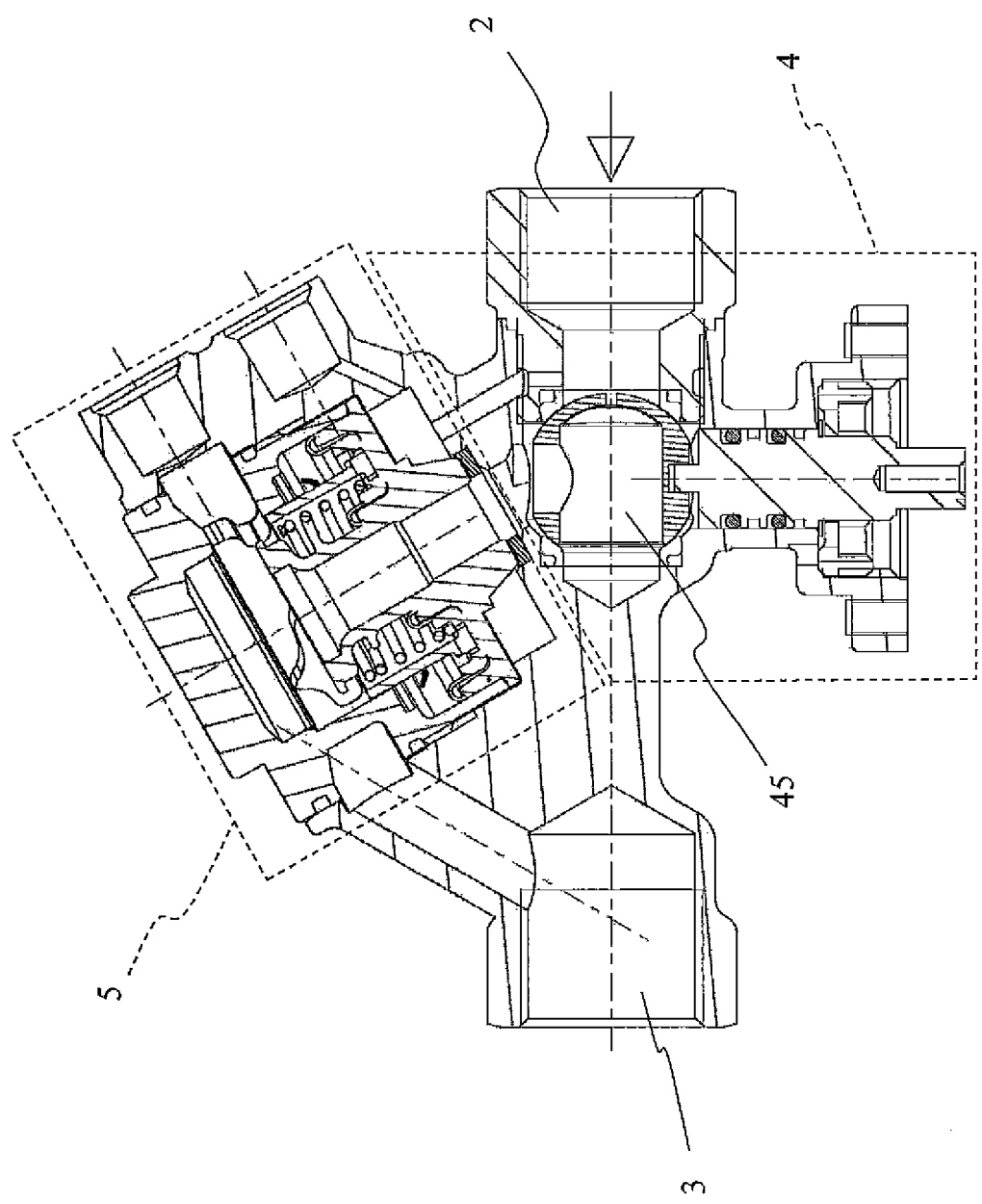
FIG. 9 is a sectional view illustrating another possible embodiment of an automatic balancing valve according to the present invention.

A possible alternative embodiment of a valve according to the present invention is depicted in FIG. 9, in which the differential-pressure regulator device 5 is the same of that one of the preceding embodiment, also if assembled in the opposite way, whereas the flow controller device 4 has a rotary ball plug 45. Due to opposite way assembling, the central duct 50 has the lower end communicating with the outlet 42 of the ball plug 45 while the opposite end of the central duct 50 is hydraulically connected to the first chamber 53.

Figure 10:
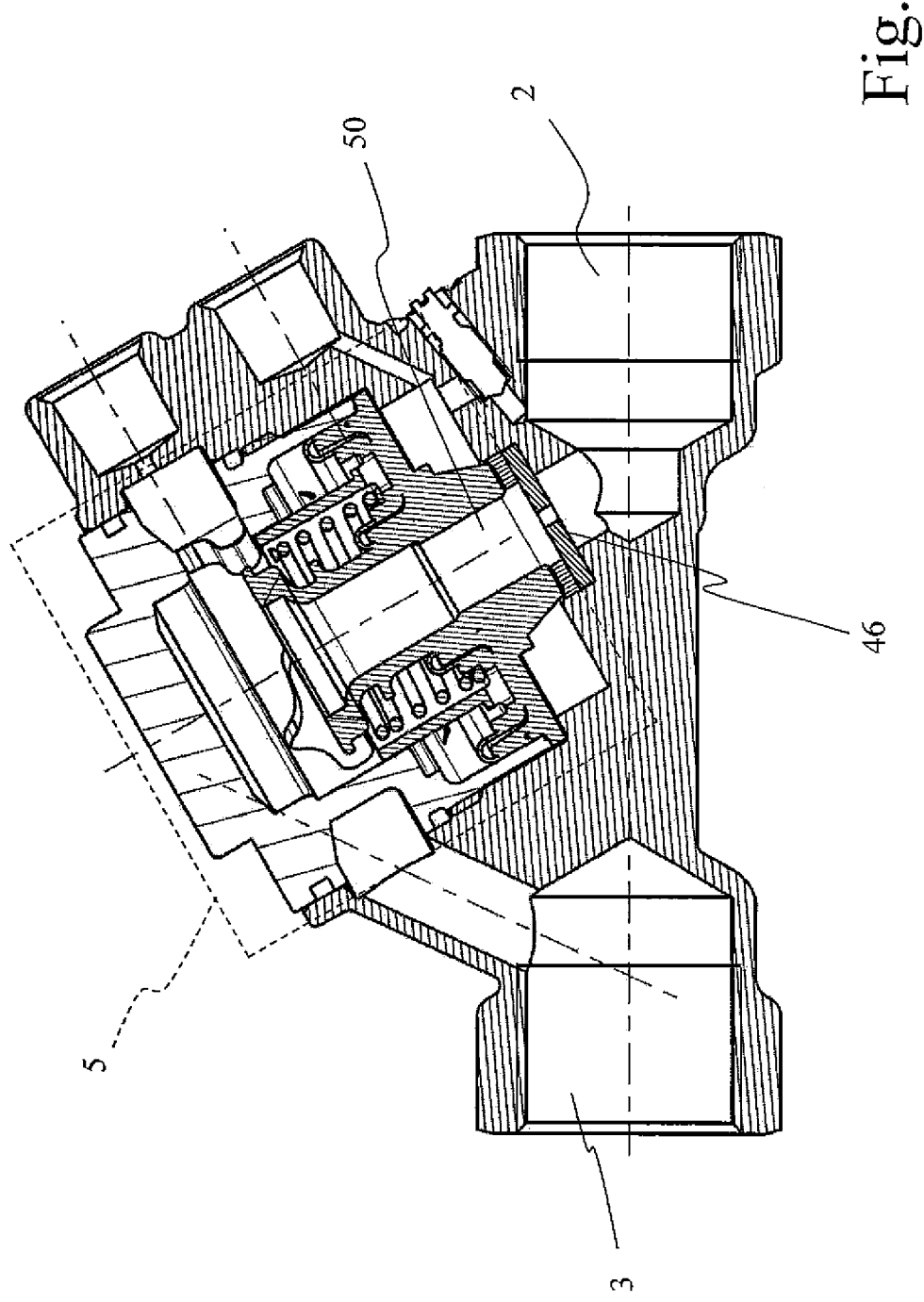
FIG. 10 is a sectional view illustrating another embodiment of an automatic balancing valve according to the present invention.

A simplified embodiment of a valve according to the present invention is depicted for example in FIG. 10, in which the flow controller device is constituted only by a gauged-hole disk 46 arranged upstream of the central duct 50 along the fluid path between the inlet channel 2 and the outlet channel 3. As in the embodiment of FIG. 9, the differential-pressure regulator device 5 is assembled in the opposite way with respect to the embodiments of FIGS. 1-7. The central duct 50 has the lower end communicating with the hole 47 of the disk 46 while the opposite end of the central duct 50 is hydraulically connected to the first chamber 53.

Various modifications can be made to the herein depicted embodiments without departing from the scope of the present invention. For example, the flow controller device can also have a disk plug with superimposed ceramic disks which are mutually and rotationally operated, instead of the disk plug 41 translationally operated or the rotary ball plug 45. Furthermore, the shape of the floating gasket 58 can also have chord sections different from those depicted, by way of example, in FIGS. 8A-8C. 8. The flow controller device can also have a disk plug provided with superimposed ceramic disks.

The invention claimed is:

1. An automatic balancing valve comprising a valve body having at least one inlet channel and at least one outlet channel in which, in the same valve body, a flow controller device and a differential-pressure regulator device are housed, wherein the differential-pressure regulator device comprises at least one central duct, and wherein the differential-pressure regulator device comprises an elastic bellows-like membrane separating the inner volume of the differential-pressure regulator in a first chamber hydraulically connected with the inlet channel and a second chamber hydraulically connected downstream to the differential-pressure regulator with respect to the fluid flow between the inlet channel and the outlet channel, wherein said differential-pressure regulator device comprises a sleeve coaxial to said central duct and mechanically connected to said elastic bellows-like membrane, the sleeve sliding axially in a seat of a locking insert housed in the valve body between a position opening at least one passage port for the fluid between said second chamber and the outlet channel, and a second position closing said at least one passage port depending on the pressure difference between said first and said second chamber, wherein between said sleeve and the respective seat of said locking insert in which it is slidingly engaged there is a gap fluidically communicating said second chamber with said outlet channel, and in that it comprises a floating gasket surrounding the outer surface of the sleeve and freely slidingly moving with respect to the sleeve between a position in which a small flow amount leaks through said gap and a position in which the leakage through said gap is blocked depending on the difference between the fluid pressure in said second chamber and the fluid pressure in said outlet channel.

2. The valve according to claim 1, wherein said flow controller device has a valve with a valve seat and a translationally movable disk plug.

3. The valve according to claim 2, wherein said central duct has an end communicating with the inlet channel and, at the opposite end, with the valve seat for the disk plug of the flow controller device.

4. The valve according to claim 1, wherein said flow controller device has a ball valve with a rotary ball plug.

5. The valve according to claim 4, wherein said central duct has an end communicating with the outlet of the ball plug, while the opposite end of the central duct is hydraulically connected to said second chamber.

6. The valve according to claim 1, wherein said flow controller device is constituted by a gauged-hole disk.

7. The valve according to claim 6, wherein said central duct has an end communicating with the hole of the gauged-hole disk, while the opposite end of the central duct is hydraulically connected to said second chamber.

8. The valve according to claim 1, wherein said floating gasket is of lip type.

9. The valve according to claim 1, wherein said floating gasket is of O-ring type.

10. The valve according to claim 1, wherein said floating gasket is of bellows type.

* * * * *